US011894752B2

(12) United States Patent
Heizmann et al.

(10) Patent No.: US 11,894,752 B2
(45) Date of Patent: Feb. 6, 2024

(54) BRUSHLESS DIRECT CURRENT MOTOR OF A HAND-HELD POWER TOOL

(71) Applicant: Robert Bosch GmbH, Stuttgart (DE)

(72) Inventors: Joachim Heizmann, Immendingen (DE); Andreas Voelkle, Filderstadt (DE); Sebastian Laber, Steinenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 17/432,854

(22) PCT Filed: Jan. 21, 2020

(86) PCT No.: PCT/EP2020/051353
§ 371 (c)(1),
(2) Date: Aug. 20, 2021

(87) PCT Pub. No.: WO2020/173618
PCT Pub. Date: Sep. 3, 2020

(65) Prior Publication Data
US 2022/0173633 A1  Jun. 2, 2022

(30) Foreign Application Priority Data

Feb. 25, 2019 (DE) .................... 10 2019 202 516.1
Mar. 8, 2019 (DE) .................... 10 2019 203 180.3

(51) Int. Cl.
*H02K 7/02* (2006.01)
*H02K 7/14* (2006.01)
*H02K 9/06* (2006.01)

(52) U.S. Cl.
CPC ............... *H02K 7/02* (2013.01); *H02K 7/145* (2013.01); *H02K 9/06* (2013.01)

(58) Field of Classification Search
CPC ........ H02K 5/1732; H02K 7/02; H02K 7/145; H02K 9/06; Y02E 60/16
See application file for complete search history.

(56) References Cited

U.S. PATENT DOCUMENTS 3,906,266 A * 9/1975 Cowman ............... B23Q 1/0009
310/74
5,375,637 A * 12/1994 Matsumoto ............... B27C 5/10
310/74

(Continued)

FOREIGN PATENT DOCUMENTS

CN 104410204 A * 3/2015
CN 206673729 U 11/2017

(Continued)

OTHER PUBLICATIONS

DE-102012216496-A1, Bevac, all pages (Year: 2014).*

(Continued)

*Primary Examiner* — Naishadh N Desai
(74) *Attorney, Agent, or Firm* — Maginot, Moore & Beck LLP

(57) ABSTRACT

A brushless direct current motor of an electrical machining device includes a stator, a rotor, a fan and a flywheel. The rotor, the fan and the flywheel are arranged for conjoint rotation on a motor shaft of the brushless direct current motor. The flywheel is at least partly surrounded axially along the motor shaft by the fan. The brushless direct current motor may be incorporated in a hand-held power tool.

11 Claims, 3 Drawing Sheets

(56) References Cited

U.S. PATENT DOCUMENTS

| | | | | |
|---|---|---|---|---|
| 5,723,923 A | * | 3/1998 | Clagett | H02K 7/025 |
| | | | | 310/74 |
| 2010/0263479 A1 | * | 10/2010 | Thompson | H02K 7/025 |
| | | | | 74/572.1 |

FOREIGN PATENT DOCUMENTS

| | | | | |
|---|---|---|---|---|
| DE | 10 2012 216 496 A1 | | 3/2014 | |
| DE | 102012216496 A1 | * | 3/2014 | B25F 5/008 |
| EP | 2 845 689 A2 | | 3/2015 | |
| EP | 3 035 508 A2 | | 6/2016 | |
| EP | 3035508 A2 | * | 6/2016 | B25F 5/00 |
| JP | S53-166114 U | | 2/1978 | |
| WO | WO-2015021328 A1 | * | 2/2015 | B60K 1/00 |

OTHER PUBLICATIONS

EP-3035508-A2, Crosby, all pages (Year: 2016).*
CN-104410204-A, Liu, all pages (Year: 2015).*
WO-2015021328-A1, Daniel, all pages (Year: 2015).*
International Search Report corresponding to PCT Application No. PCT/EP2020/051353, dated Mar. 31, 2020 (German and English language document) (6 pages).

* cited by examiner

BRUSHLESS DIRECT CURRENT MOTOR OF A HAND-HELD POWER TOOL This application is a 35 U.S.C. § 371 National Stage Application of PCT/EP2020/051353, filed on Jan. 21, 2020, which claims the benefit of priority to Serial Nos. DE 10 2019 202 516.1, filed on Feb. 25, 2019, and DE 10 2019 203 180.3, filed on Mar. 8, 2019, both filed in Germany, the disclosures of which are incorporated herein by reference in their entirety.

BACKGROUND

The disclosure relates to a brushless DC motor—also known as a BLDC (brushless direct current) or EC (electronically commutated) motor—of an electric machining device. The brushless DC motor has a stator, a rotor, a fan and a flywheel, wherein the rotor, the fan and the flywheel are arranged for conjoint rotation on a motor shaft of the brushless DC motor. The disclosure also relates to an electric power tool having a brushless DC motor according to the disclosure.

On account of their design, rotors of brushless DC motors have a very low moment of inertia. Compared with a brushed DC motor, there are no windings on the rotor. In addition, the rotor diameter of a brushless DC motor is generally smaller than that of a brushed DC motor. As a result, the rotational energy, stored when idling, of a BLDC motor is lower by at least one order of magnitude. During the use of many electric machining devices, in particular electric power tools, high stored rotational energy may be very advantageous, however, in order to make the machining operations more comfortable and more efficient.

DE 10 2012 216 496 A1 discloses a hand-held power tool, in particular a hammer drill, drill driver or impact driver, having an electronically commutated drive motor. The drive motor is provided with a disk-like rotor and a stator. Formed on the rotor is a flywheel, which, according to one embodiment, is in the form of an at least partially disk-like flywheel mass. Provided on a motor shaft of the brushless DC motor, or on the flywheel mass, is an optional fan wheel for cooling. The fan wheel may be, for example, a component produced from a plastics material by an injection-molding process or a component produced from a metal sheet by a stamping and bending technique, said component being adhesively bonded and/or connected by a material bond to the flywheel mass.

EP 2 845 689 A2 discloses an electric power tool, in which a flywheel can be driven by a drive unit in order to supply a tool body with kinetic energy by a force transmitting portion of the flywheel. Furthermore, a ventilating unit is attached such that it generates cooling air together with the flywheel.

It is an object of the disclosure to provide, with respect to the prior art, a brushless DC motor for an electric machining device, said brushless DC motor, in spite of its comparatively low weight and its high power density, meeting the requirements of a high moment of inertia with, at the same time, sufficient cooling and a compact overall size of the electric machining device.

SUMMARY

To achieve the stated object, it is provided that the flywheel is enclosed at least partially by the fan axially along the motor shaft. In this way, a particularly short design together with a high maximum torque of the BLDC motor is possible. At the same time, the proposed solution is very robust and reliable in operation.

In the context of the disclosure, an electric machining device should be understood as being, inter alia, battery- or line-operated electric power tools for machining workpieces by means of an electrically driven application tool. In this case, the electric machining device can be in the form both of a portable power tool or of a stationary electric power tool. Typical electric power tools in this connection are hand drills or standing drills, screwdrivers, impact drills, planes, angle grinders, orbital sanders, polishing machines or the like. Suitable electric machining devices are also motor-driven gardening appliances such as lawnmowers, lawn trimmers, branch saws or the like, however. Furthermore, the disclosure is applicable to brushless DC motors of domestic appliances such as vacuum cleaners, mixers, etc.

In a further configuration of the disclosure, the fan completely surrounds the flywheel in the radial direction of the motor shaft. As a result, a particularly good form-fitting and/or materially bonded connection between the fan and the flywheel can be achieved. In addition, axial protrusions of the flywheel with respect to the fan are avoided, such that the design of the BLDC motor and thus also that of the electric machining device can be kept compact.

Advantageously, the flywheel has very high inertia, a very high shaft pressure and a very high homogeneous density. As a result, the proposed solution is easy and cost-effective to produce without balancing. In addition, a very good form fit and/or material bond with the motor shaft is ensured. Very advantageously, the flywheel is manufactured in one piece from brass or from iron. Brass is particularly suitable as material for producing a rapidly rotating flywheel, since its density of typically 8.5 g/cm$^3$ brings about very high inertia with a small overall size and the elastic modulus of brass of up to 120 GPa allows a very high shaft pressure. This reliably prevents potential spinning of the wheel during operation. As a result of the high homogeneous density of brass, the flywheel can be installed directly without a complicated and expensive balancing process. The structural unit made up of the rotor, fan and flywheel can thus meet the requirements of maximum permissible rotor imbalance without additional processing processes. Corresponding advantages arise when iron is used instead of brass. It is also conceivable, however, to manufacture the flywheel from ceramic, cast stone or other materials, in particular plastics, which have comparable properties to those of brass that are mentioned above.

In a further configuration, the flywheel transitions into the fan in a flush manner at least on one side in the radial direction of the motor shaft. In this way, it is possible to effectively avoid unfavorable noise that could occur during operation of the BLDC motor or of the electric machining device. In addition, the available cross-sectional area for the cooling air flow of the motor is not constricted.

It is also provided that, in the radial direction of the motor shaft, an external contour of the flywheel, along at least 50% of its axial extent along the motor shaft, corresponds substantially to an external contour of the fan. In this way, easy and cost-effective encapsulation of the flywheel with the fan with at the same time a good form fit and/or material bond can be realized. It is furthermore advantageous for the flywheel to taper, in particular in a conical manner, along at least 50% of its axial extent along the motor shaft. This allows both easier encapsulation of the flywheel from one side and easier introduction of the fan onto the flywheel, or easier insertion of the flywheel into the fan. This can be supported by the fact that the flywheel has a convex shape at least on one side, this approximating the profile or shape of the cooling air flow of the motor.

In order that the fan exhibits a secure axial fit on the flywheel, the flywheel has, at one axial end, a groove extending around its radially outer periphery, in which a radially inwardly protruding collar of the fan engages.

The disclosure also relates to a hand-held power tool having a brushless DC motor according to the disclosure.

BRIEF DESCRIPTION OF THE DRAWINGS

The disclosure is explained by way of example in the following text with reference to FIGS. 1-4, wherein the same reference signs in the figures indicate identical components with an identical functionality.

In the drawing.

DETAILED DESCRIPTION

Figure 1:
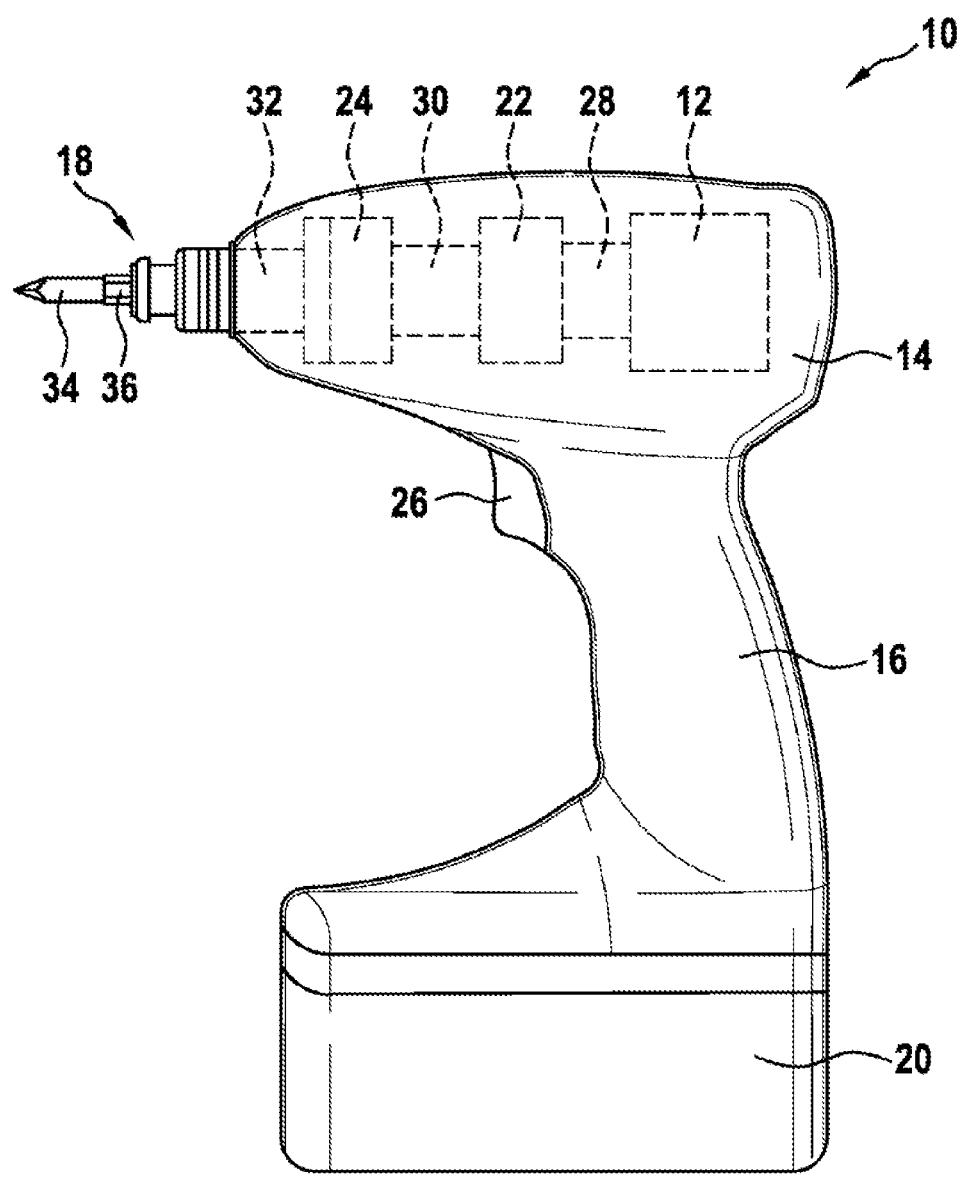
FIG. 1 shows a schematic illustration of an electric machining device, in the form of a hand-held power tool having a brushless or electronically commutated DC motor.

FIG. 1 shows by way of example an electric machining device, in the form of a hand-held power tool 10, having an electronically commutated DC motor 12. As illustrated, the hand-held power tool 10 has a housing 14 with a handle 16 and a tool receptacle 18 and, for example for line-independent power supply, is able to be connected mechanically and electrically to a battery pack 20. In the present example, the battery pack 20 has a supply voltage of 10.8 V. However, the disclosure can also be applied, without limitation, to electric machining devices with battery packs of other voltage and power classes.

The hand-held power tool 10 is in the form here of a battery impact driver, for example. However, it should be noted that the present disclosure is limited neither to battery impact drivers nor to hand-held power tools in general, but can be used in different electric machining devices, in which a BLDC or EC motor 12 is used, for example in hand drills or standing drills, screwdrivers, impact drills, planes, angle grinders, orbital sanders, polishing machines or the like, but also in motor-driven gardening appliances such as lawnmowers, lawn trimmers, branch saws or the like, or domestic appliances such as vacuum cleaners, mixers, etc., regardless of whether the electric machining device is able to be operated in a line-independent manner with the battery pack 20 or in a line-dependent manner.

Arranged in the housing 14 are, for example, the BLDC motor 12, which is supplied with current by the battery pack 20, a transmission 22 and an impact mechanism 24. According to one embodiment, the motor 12 is configured in the manner of a pancake motor and is actuable, i.e. able to be switched on and off, for example via a manual switch 26. In the following text, for the sake of simplicity, only the term motor is used, even if this always means a BLDC or EC motor. Preferably, the motor 12 is able to be subjected to electronic open-loop or closed-loop control such that both reversing operation and settings with regard to a desired rotational speed and/or a torque are able to be realized. The functionality and the design of the motor 12 are well known to a person skilled in the art and will therefore not be discussed further in the description.

As illustrated, the motor 12 is connected via an associated motor shaft 28 to the transmission 22, which converts a rotation of the motor shaft 28 into a rotation of a drive member 30, for example a driveshaft, provided between the transmission 22 and impact mechanism 24. This conversion takes place preferably such that the drive member 30 rotates relative to the motor shaft 28 with a greater torque but reduced rotational speed. The motor 20 and the transmission 22 are arranged for example in the housing 14, but can, as an alternative, also be arranged in a housing assigned thereto or in separate motor and transmission housings, which are, for their part, arranged in turn in the housing 14.

The impact mechanism 24 connected to the drive member 30 is for example a rotary or rotational impact mechanism, which generates high-intensity percussive rotary impulses and transmits them to an output shaft 32, for example an output spindle. Provided on the output shaft 32 is the tool receptacle 18, which is configured preferably to receive application tools and, according to one embodiment, is able to be connected both to an application tool with an external coupling, for example a screwdriver bit, and to an application tool with an internal coupling, for example a socket wrench. As illustrated, the tool receptacle 18 is able to be connected to an application tool 34 with an external polygon coupling 36 or to an application tool with an internal polygon coupling. The application tool 34 is configured for example as a screwdriver bit with the external polygon coupling 36 embodied, as illustrated, as a hex coupling, which is arranged in the tool receptacle 18. Such a screwdriver bit is well known from the prior art, and so a detailed description will be dispensed with here for the sake of conciseness of the description.

Figure 2:
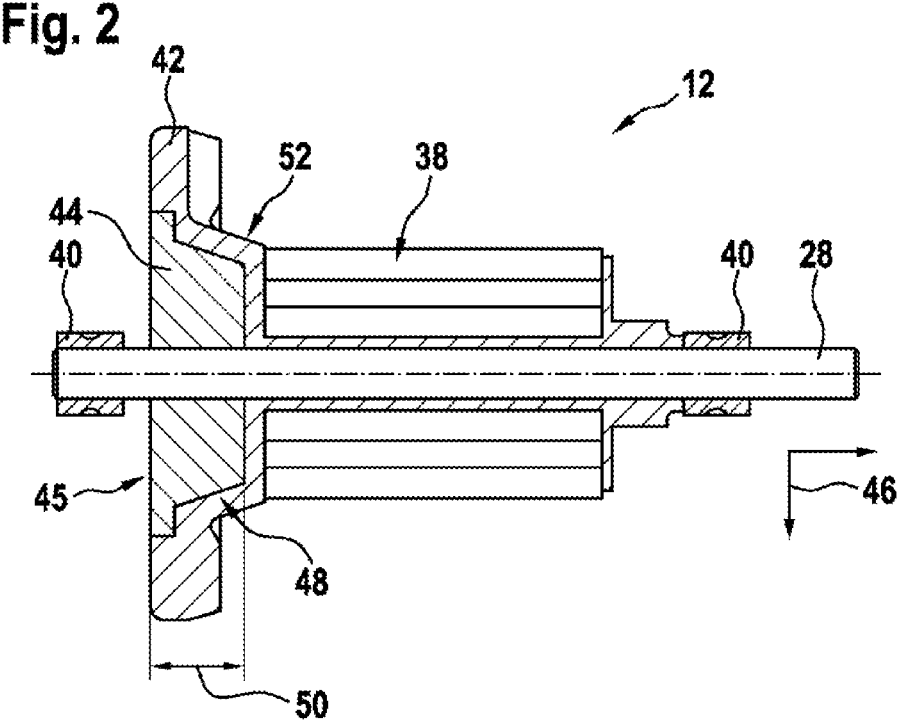
FIG. 2 shows a schematic illustration of a BLDC or EC motor according to the disclosure having a flywheel in a first exemplary embodiment.
Figure 4:
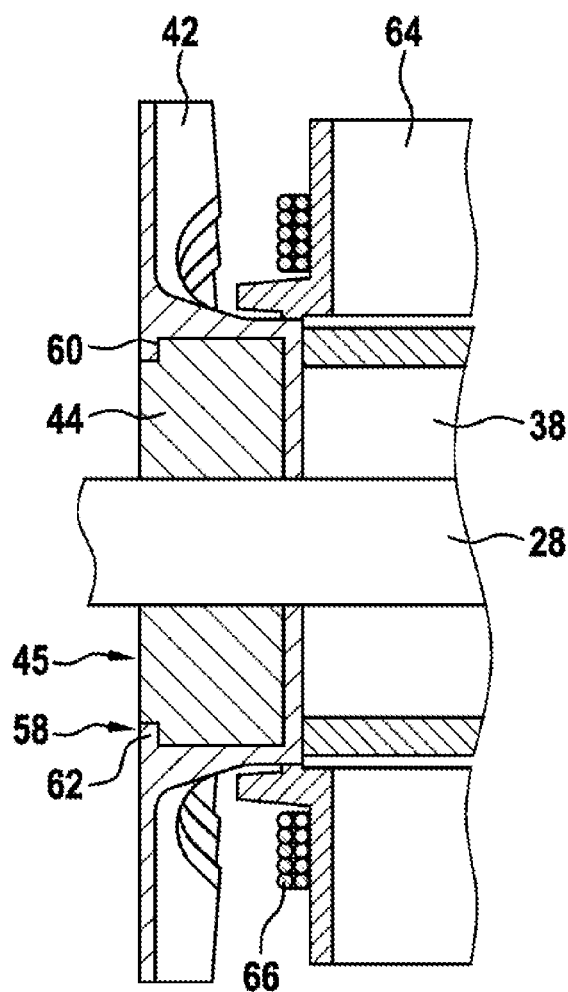
FIG. 4 shows a schematic illustration of a BLDC or EC motor according to the disclosure having a flywheel in a third exemplary embodiment.

FIG. 2 shows the motor 12 configured in accordance with a first embodiment, wherein the stator having the drive windings is not illustrated (cf. in this regard FIG. 4). The brushless DC motor 12 has a rotor 38 which is mounted for conjoint rotation on the motor shaft 28 and which, on account of its construction, has a relatively low moment of inertia compared with brushed DC motors. This is because the rotor 38 does not have to carry any windings and also because, compared with the rotor of a brushed DC motor, it can have a much smaller diameter. Therefore, the problem arises that certain machining processes to be carried out with the electric machining device in conjunction with a BLDC motor can no longer be carried out as efficiently and uniformly on account of the relatively small amount of stored rotational energy.

The motor shaft 28 is rotatably mounted via two ball bearings 40 in the housing 14 of the hand-held power tool 10. Rather than the ball bearings 40, it is also possible to use other types of bearings, for example rolling or plain bearings, without limiting the disclosure. To cool the motor 12 and optionally power electronics (not shown) actuating the latter, a fan 42 is arranged for conjoint rotation on the motor shaft 28. Said fan 42 is produced generally as an injection-molded plastics part. In the exemplary embodiment shown, the injection-molded plastics part 42 carries the rotor 38 along its entire length. It is also possible, however, for the fan 42 to be configured as an injection-molded part separate from the rotor 38.

According to the disclosure, a flywheel 44 is arranged for conjoint rotation on the motor shaft 28, said flywheel 44 being enclosed at least partially by the fan 42 axially along the motor shaft 28. This allows a particularly short design of the BLDC motor 12 in conjunction with a high maximum torque. In addition, the solution is very robust and reliable in operation. The fan 42 completely encloses the flywheel 44 in the radial direction 46 of the motor shaft 28 in order to achieve a particularly good form-fitting and/or materially bonded connection between the fan 42 and the flywheel 44 and to avoid axial protrusions of the flywheel 44 with respect to the fan 12.

The flywheel 44 has very high inertia, a very high shaft pressure and a very high homogeneous density. To this end, the flywheel 44 is manufactured preferably in one piece from brass or from iron. Brass is particularly suitable as material, since its density of typically 8.5 g/cm$^3$ brings about very high inertia with a small overall size and the elastic modulus of brass of up to 120 GPa allows a very high shaft pressure. Thus, potential spinning of the flywheel 44 on the motor shaft 28 during operation can be effectively prevented. As a result of the high homogeneous density of brass, the flywheel 44 can be installed directly without a complicated and expensive balancing process. The structural unit made up of the rotor 38, fan 42 and flywheel 44 can thus meet the requirements of maximum permissible rotor imbalance without additional processing processes. Instead of brass or iron, it is also conceivable to produce the flywheel 44 from ceramic, cast stone or other materials, in particular plastics, which have comparable properties.

The flywheel 44 transitions into the fan 42 in a flush manner at least on one side at its axial end 45 in the radial direction 46 of the motor shaft 28, in order for example to effectively avoid undesired noise that could arise during operation of the motor 12 or of the electric machining device 10. In order to realize easy and cost-effective encapsulation of the flywheel 44 with the fan 42 with a simultaneously good form fit and/or material bond, in the radial direction 46 of the motor shaft 28, an external contour 48 of the flywheel 44, along at least 50% of the axial extent 50 of the flywheel 44, corresponds substantially to an external contour 52 of the fan 42. In addition, the flywheel 44 tapers, in particular in a conical manner, along at least 50% of its axial extent 50 along the motor shaft 28, in order to allow both easier encapsulation of the flywheel 44 from one side and easier introduction of the fan 42 onto the flywheel 44, or easier insertion of the flywheel 44 into the fan 42. This can be supported by the fact that the flywheel has a convex shape at least on one side at its axial end 45. This additionally ensures that the flywheel 44 does not have a negative effect on the air flow of the fan 42.

The connection between the rotor 38, flywheel 44, fan 42 and motor shaft 28 can be produced in different ways. Thus, it is possible first of all to encapsulate the flywheel 44 with a fan 42, in order to subsequently press this component onto the motor shaft 28 of the brushless DC motor 12. Alternatively, the rotor 38 can also be encapsulated with the fan 42, in order to subsequently insert the flywheel 44 into the fan 42 and press it together with the motor shaft 28. It is also conceivable to produce the fan 42, the flywheel 44 and the rotor 38 as individual parts, in order then to press these individually onto the motor shaft 28. In this case, the flywheel 44 can optionally be inserted into the fan 42 or the fan 42 can be introduced onto the flywheel 44.

Figure 3:
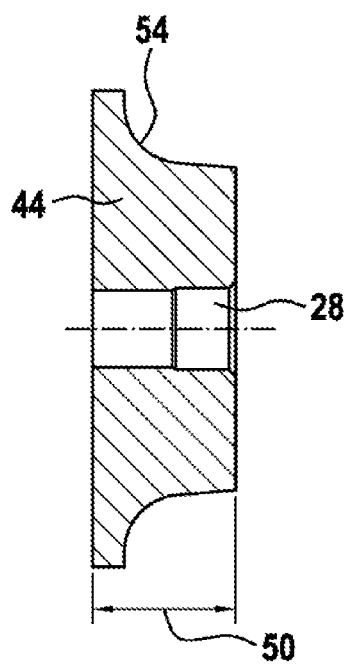
FIG. 3 shows a schematic illustration of a BLDC or EC motor according to the disclosure having a flywheel in a second exemplary embodiment.

FIGS. 3 and 4 each show a schematic illustration of a second and third exemplary embodiment of the flywheel 44 of the BLDC or EC motor 12 according to the disclosure. In FIG. 3, in contrast to FIG. 2, the flywheel 44 does not taper in a conical manner but rather, along about 50% of its axial extent 50 along the motor shaft 28, in a nonlinear manner with a radius 54, in order then to run out in a slightly conical manner in the direction of the rotor (not shown) along the remaining 30%. In FIG. 4, the flywheel 44 has, at one axial end 45, a groove 60 extending around its radially outer periphery 58, into which a radially inwardly protruding collar 62 of the fan 42 engages. In this way, the fan 42 exhibits a secure axial fit on the flywheel 44. In addition, assembly can be simplified since the fan 42, as a complete injection-molded part, only has to be introduced onto the flywheel 44, which has already been pressed onto the motor shaft 28, in order subsequently to press the rotor 38 onto the motor shaft 28. In FIG. 4, the stator 64, which is not illustrated in FIGS. 2 and 3, with its drive windings 66 can furthermore be seen.

Finally, it should be noted that the shown exemplary embodiments are limited neither to the size relationships, illustrated in FIGS. 1 to 4, between the stator and flywheel or fan nor to the arrangement and number of bearing points of the motor shaft, of drive windings or of other features that do not immediately relate to the disclosure.

The invention claimed is:

1. A brushless DC motor of an electric machining device, comprising:
   a stator;
   a rotor;
   a fan;
   a flywheel; and
   a motor shaft on which the rotor, the fan and the flywheel are arranged for conjoint rotation,
   wherein the flywheel is enclosed at least partially by the fan axially along the motor shaft.

2. The brushless DC motor as claimed in claim 1, wherein the fan completely surrounds the flywheel in a radial direction of the motor shaft.

3. The brushless DC motor as claimed in claim 1, wherein the flywheel has very high inertia, a very high shaft pressure, and a very high homogeneous density.

4. The brushless DC motor as claimed in claim 1, wherein the flywheel consists integrally of brass or of iron.

5. The brushless DC motor as claimed in claim 1, wherein the flywheel transitions into the fan in a flush manner at least on one side in a radial direction of the motor shaft.

6. The brushless DC motor as claimed in claim 1, wherein, in a radial direction of the motor shaft, an external contour of the flywheel, along at least 50% of its an axial extent of the flywheel along the motor shaft, corresponds substantially to an external contour of the fan.

7. The brushless DC motor as claimed in claim 1, wherein the flywheel tapers along at least 50% of its an axial extent of the flywheel along the motor shaft.

8. The brushless DC motor as claimed in claim 1, wherein the flywheel has a convex shape on at least one side.

9. The brushless DC motor as claimed in claim 1, wherein a first axial end of the flywheel axial end, defines a groove extending around a radially outer periphery of the first axial end, and the fan includes a radially inwardly protruding collar that engages in the groove.

10. A hand-held power tool comprising:
    a brushless DC motor and comprising:
       a stator;
       a rotor;
       a fan;
       a flywheel; and
       a motor shaft on which the rotor, the fan and the flywheel are arranged for conjoint rotation,
       wherein the flywheel is enclosed at least partially by the fan axially along the motor shaft.

11. The brushless DC motor as claimed in claim 7, wherein the flywheel tapers in a conical manner.

\* \* \* \* \*

UNITED STATES PATENT AND TRADEMARK OFFICE
CERTIFICATE OF CORRECTION

PATENT NO. : 11,894,752 B2
APPLICATION NO. : 17/432854
DATED : February 6, 2024
INVENTOR(S) : Heizmann et al.

It is certified that error appears in the above-identified patent and that said Letters Patent is hereby corrected as shown below:

In the Claims

In Claim 6, at Column 6, Line 45: "of its an axial extent" should read --of an axial extent--;

In Claim 7, at Column 6, Line 49: "of its an axial extent" should read --of an axial extent--;

In Claim 9, at Column 6, Lines 54: "a first axial end of the flywheel axial end," should read --a first axial end of the flywheel--; and In Claim 10, at Column 6, Lines 59: "motor and comprising:" should read --motor comprising:--.

Signed and Sealed this
Twenty-seventh Day of August, 2024

Katherine Kelly Vidal
*Director of the United States Patent and Trademark Office*